United States Patent Office 2,982,749
Patented May 2, 1961

2,982,749
INVERSE SUSPENSION POLYMERIZATION OF WATER SOLUBLE UNSATURATED MONOMERS

Ralph E. Friedrich and Ralph M. Wiley, Midland, and Walter L. Garrett, Freeland, Mich., assignors to The Dow Chemical Company, Midland, Mich., a corporation of Delaware No Drawing. Filed July 15, 1957, Ser. No. 671,742

8 Claims. (Cl. 260—23)

This invention concerns a polymerization process in which an aqueous solution of a water-soluble unsaturated monomer is suspended in an oil phase and polymerized therein to give polymeric products in bead form.

Water soluble unsaturated monomers are conventionally polymerized by mass, solution or special oil-in-water suspension techniques.

It has now been discovered that aqueous solutions of water-soluble unsaturated monomers and mixtures thereof can be suspended in an oil phase to form a suspension of globules ranging between 10 microns and 2 mms. in diameter and polymerized therein to give polymeric products in bead form having a controlled size. The bead size is controlled by the efficiency and amount of suspending agent.

The suspending agent is a solid or liquid substance having a low hydrophile-lyophile balance, i.e., is preponderantly hydrophobic. Inorganic hydroxy-oxides having substituent hydrocarbonylsilyl, hydrocarbonylsilylene or hydrocarbonylsilylidyne radicals, of the type described and claimed in U.S. patent application Serial No. 646,-573, filed March 18, 1957, hereinafter referred to as low hydrophile-lyophile silanized inorganic hydroxy-oxides or low hydrophile-lyophile silanized silica, etc., are particularly useful suspending agents. Other useful solid suspending agents include low hydrophile-lyophile kaolin treated with rosin amine, bentonite treated with organic ammonium cation yielding reagents, etc. Suspending agents which are useful in the liquid state include ethyl cellulose and organic polymers which, while predominantly hydrophobic, have hydrophilic substituents such as amine, sulfone, carboxy and the like groups. They are dissolved in the hydrophobic dispersion medium. Their low hydrophile-lyophile balance promotes water-in-oil suspensions. In general, any inert finely divided solid or high molecular weight polymer can be converted to a water-in-oil suspending agent by first determining how it distributes itself when shaken with a mixture of the oil and the aqueous phase to be suspended. If the suspending agent goes entirely into either the oil or the aqueous phase, it is either too strongly hydrophobic or too strongly hydrophilic, and requires surface treatment with a hydrophilic substance in the first case and with a hydrophobic substance in the second case. In the case of silica and most siliceous clays, the particles require treatment with a strongly hydrophobic substance such as an organic amine or an organic silane, preferably of the long-chain type. In the case of highly cross-linked organic high polymer particles such as styrene latex particles, hydrophilic groups such as amine, sulfone, carboxy, etc. must be introduced in order to increase the hydrophilicity of the surface. The optimum amount and manner of introduction of the hydrophile-lyophile balance adjusting groups cannot be predicted in advance, since it depends on numerous factors such as the nature of the oil and aqueous phases, the size of the suspended droplets desired, and the chemistry of adsorption or reaction between the solid surface and the hydrophile-lyophile balance adjusting agent. In any event, a simple test or trial suffices to show the suitability of a proposed suspending agent, or the modification needed. In order to obtain high covering power per gram of suspending agent when a solid suspending agent is used, a solid having small particles such as bentonite, finely divided silica, etc. is desirable. With coarser solids, larger amounts must be used in the suspension recipe. The amount of suspending agent used ranges advantageously from about 0.01 weight percent to about 10 percent, water phase basis, depending upon the suspending agent and the water-in-oil system. As the proportion of suspending agent increases, the polymer bead size decreases.

All known water-soluble unsaturated monomers can be polymerized by the inverse suspension polymerization process of this invention. Such monomers include acrylamide, methacrylamide, acrylic acid, methacrylic acid, vinylbenzyl trimethylammonium chloride, alkali metal and ammonium salts of 2-sulfoethylacrylate, 2-aminoethyl methacrylate hydrochloride, alkali metal and ammonium salts of vinylbenzyl sulfonate, etc. Aqueous solutions of the monomers to be polymerized can be varied widely in monomer content, i.e., from about 5 to 80 weight percent of monomer in water, depending upon the monomer and the polymerization temperature. The ratio of aqueous monomer phase to oil phase is also widely variable, advantageously from about 5 to 75 weight parts of aqueous phase to 95 to 25 parts of oil phase.

The oil phase can be any inert hydrophobic liquid which can be separated readily from the polymeric product. Of such liquids the hydrocarbons and chlorinated hydrocarbons such as toluene, xylene, o-dichlorobenzene, monochlorobenzene, propylene dichloride, carbon tetrachloride, etc. are advantageously used. Toluene and xylene are preferred as oil phase liquids.

The reaction time is widely variable depending upon the catalyst system, and ranges generally between about 10 minutes and two hours at temperatures between about 20 and 100° C.

The reaction is usually carried out at atmospheric or substantially atmospheric pressure. However, superatmospheric pressure is advantageously used when volatile ingredients are involved.

Polymerization initiators including peroxide catalysts such as t-butyl hydroperoxide and dimethane sulfonyl peroxide and redox systems such as t-butyl hydroperoxide or potassium persulfate in combination with usual reductants can be used in the practice of this invention. Alternatively free radicals can be generated in situ by ultraviolet or X-rays.

In practice, the water-in-oil suspending agent is dissolved or suspended in the oil phase, depending upon the type used, as indicated. An aqueous solution of monomer or mixed monomers with or without added polymerization initiator is then added to the oil phase with vigorous agitation until the aqueous solution is suspended in the oil phase as globules ranging between 10 microns and 2 mms. in diameter. The reaction temperature is then raised to between 20° and 100° C. as desired, preferably with continued mild agitation to prevent separation of phases or adhesion of polymer beads. Polymerization is initiated by an added free radical generator or by ultraviolet or X-radiation, as indicated. The order of addition of reaction media ingredients is not important. The reaction is continued, generally with mild agitation, until conversion is substantially complete. Polymeric beads are thereby formed, which are separated from the reaction medium, washed and dried. The physical form of the beads and their higher bulk density make for ease of separating, washing, drying and subsequent handling. The beads have a fast solution rate without the danger of breakdown which is present with other forms of polymer requiring heating or mechanical subdividing to expedite solution thereof. The polymeric beads of this invention are useful as binders in coating compositions, and as flocculating, suspending or thickening agents.

The following examples show ways in which the invention has been practiced.

*Example 1.—Polyacrylamide beads, silanized silica suspending agent*

Recipe:
```
800 lbs. aqueous 50 percent acrylamide, pH 5.3
 25 p.p.m. potassium persulfate        ⎫
 20 p.p.m. tertiary-butyl hydroperoxide ⎬ acrylamide
 20 p.p.m. 2-mercaptoethanol            ⎪ basis
100 p.p.m. sodium meta-bisulfite        ⎭
1950 lbs. xylene
0.6 percent low hydrophile-lyophile silanized silica,
    aqueous phase basis
```

The peroxide, persulfate and mercaptan were added to the aqueous acrylamide. The bisulfite was added to the xylene contained in a glass lined reactor provided with a thermometer and stirrer. The aqueous acrylamide phase was then added to the oil phase with vigorous agitation to form aqueous droplets containing acrylamide suspended in the oil phase. Polymerization under a nitrogen atmosphere was initiated at 30° C. The monomer polymerized adiabatically, and a peak reaction temperature of 84° C. was noted after 15 minutes. Reaction was continued for a half hour after the peak temperature was noted. Gentle agitation was maintained during the polymerization cycle. Acrylamide polymer beads ranging between 75 and 500 microns in particle diameter were separated from the xylene by centrifuging, washed in acetone and dried in a flash drier. The polymer viscosity, 0.5 weight percent in water, pH of 3, was 22.2 cps. At a concentration of 0.05 lb. of this polyacrylamide flocculant per ton of Peabody coal in a 5.0 percent slurry in water, limed to a pH of 11.0, the settling rate was 2.81 ins. per minute, with a slightly cloudy overhead, as compared with a settling rate of 0.53 in. per minute without the polyacrylamide flocculant. The flocculant was aded in three increments with three inversion of slurry per increment.

*Example 2.—Poly(vinylbenzyl trimethylammonium chloride) beads, silanized silica suspending agent*

Recipe:
```
40 mls. aqueous 20 percent vinylbenzyl trimethylam-
   monium chloride, pH 7                ⎫ vinylbenzyl
2000 p.p.m. ethylene diamine tetraacetic ⎬ trimethyl-
     acid tetrasodium salt               ⎪ ammonium
2500 p.p.m. tertiary butyl hydroperoxide ⎪ chloride
                                         ⎭ basis
120 mls. xylene
0.3 g. low hydrophile-lyophile silanized silica
```

The ethylene diamine tetraacetic acid tetrasodium salt and peroxide were added to the aqueous vinylbenzyl trimethylammonium chloride. The silanized silica was added to the xylene. The aqueous monomer phase was then added to the oil phase with vigorous agitation to form suspended droplets of aqueous monomer phase in the xylene phase. Polymerization was then initiated in a 76° C. water bath with gentle agitation. Polymerization in the water bath was continued for 20 hours. Polymeric beads ranging in particle diameter between 10 and 50 microns were separated from the xylene phase, washed and dried. The viscosity of a 0.5 weight percent solution of the beads in aqueous 2 percent sodium chloride was 1.54 cps.

*Example 3.—Polyacrylic acid beads, silanized silica suspending agent*

Recipe:
```
40 mls. aqueous 50 percent acrylic acid
200 p.p.m. sodium meta-bisulfite   ⎫ acrylic acid basis
100 p.p.m. potassium persulfate    ⎭
120 mls. xylene
0.15 g. low hydrophile-lyophile silanized silica
```

The sodium meta-bisulfite and potassium persulfate were added to the aqueous acrylamide and the silanized silica was added to the xylene. The aqueous acrylic acid phase was then added to the oil phase with vigorous agitation to form aqueous droplets containing acrylic acid suspended in the oil phase. The suspension was purged with nitrogen to remove oxygen. Polymerization under a nitrogen atmosphere was initiated and continued for one hour in a water bath maintained at 70° C. The polyacrylic acid beads so obtained were separated, washed and dried. They ranged in particle diameter between 35 and 100 microns. A 0.5 weight percent solution of such beads in aqueous 2 percent sodium chloride had a viscosity of 35.8 centiposes (pH 7).

*Example 4.—Poly ar (sodium styrene sulfonate) beads, silanized silica suspending agent*

Recipe:
```
40 mls. aqueous 20 percent ar sodium styrene sulfonate,
   pH 2.5
100 p.p.m. potassium persulfate   ⎫ sodium styrene
100 p.p.m. sodium meta-bisulfite  ⎭ sulfonate basis
120 mls. xylene
0.2 g. low hydrophile-lyophile silanized silica
```

The procedure of Example 3 was followed for a polymerization time of 7 hours. Polymeric beads having a particle diameter ranging between 10 and 100 microns were obtained. A 0.5 weight percent solution of the beads in aqueous 2 percent sodium chloride had a viscosity of 1.99 cps., corresponding to a molecular weight of 330,000.

*Example 5.—Copolymeric acrylamide-p-vinylbenzyl trimethylammonium chloride beads, aminated bentonite suspending agent*

Recipe:
```
40 mls. 50:50 mixture of aqueous 50 percent acrylamide
   and vinylbenzyl trimethylammonium chloride
200 p.p.m. sodium meta-bisulfite  ⎫ monomer basis
200 p.p.m. potassium persulfate   ⎭
80 mls. xylene
0.6 g. low hydrophile-lyophile bentonite, organic quater-
   nary ammonium substituted
```

The procedure of Example 2 was followed. Polymeric beads having a particle diameter ranging between 25 and 50 microns were obtained. The polymer viscosity, 0.5 weight percent in aqueous 2 percent sodium chloride, was 2.1 cps.

*Example 6.—Polyacrylamide beads, oil-soluble ethyl cellulose suspending agent*

Recipe:
```
40 mls. aqueous 50 percent acrylamide
 50 p.p.m. potassium persulfate    ⎫ acrylamide basis
100 p.p.m. sodium meta-bisulfite   ⎭
80 mls. propylene dichloride
0.4 g. oil-soluble ethyl cellulose
```

In this example, the ethyl cellulose was dissolved in the propylene dichloride. Otherwise, a procedure similar to that of Example 3 was followed. Polyacrylamide beads similar in appearance to those of Example 1 were obtained.

*Example 7.—Polyacrylamide beads, rosin amine-clay suspending agent*

Recipe:
```
40 mls. aqueous 50 percent acrylamide
100 p.p.m. potassium persulfate    ⎫ acrylamide basis
200 p.p.m. sodium meta-bisulfite   ⎭
80 mls. xylene
0.4 g. low hydrophile-lyophile rosin amine-treated kaolin
```

The rosin amine-treated kaolin was suspended in the xylene. Otherwise, a procedure similar to that of Example 3 was followed. Polyacrylamide beads like those of Example 1 were obtained.

*Example 8.—Polyacrylamide beads, partially sulfonated polyvinyltoluene suspending agent*

Recipe:
```
800 mls. aqueous 37 percent acrylamide, pH 5.5
 20 p.p.m. potassium persulfate       ⎫
 40 p.p.m. 2-mercaptoethanol          ⎬ acrylamide basis
 20 p.p.m. tertiary butyl hydroperoxide ⎭
200 mls. commercial xylene
0.2 percent, aqueous phase basis, 4 percent sulfonated
   polyvinyltoluene
```

The sulfonated polyvinyltoluene was dissolved in the xylene. The potassium persulfate, 2-mercaptoethanol and tertiary-butyl hydroperoxide were added to the acrylamide. The aqueous phase was added to the oil phase with vigorous agitation to form a suspension of aqueous droplets containing monomer in the oil phase. After purging for 10 minutes with nitrogen, 50 p.p.m. of sodium meta-bisulfite, acrylamide basis, was added. The polymerization reaction was initiated at 32° C. After 20 minutes the reaction temperature was 70° C. An additional 50 p.p.m. of sodium meta-bisulfite was then added. At the end of 23 minutes the reaction temperature was 72.7° C. An additional 20 p.p.m. of sodium meta-bisulfite and 20 p.p.m. t-butyl hydroperoxide was then added. The reaction peaked at 73.5° C. 25 minutes after the adiabatic reaction was initiated. The reaction was continued for 32 minutes longer. Polymeric beads similar in appearance to those of Example 1 were obtained. The solution viscosity, 0.5 weight percent in water, was 12.8 cps. (pH 3).

*Example 9.—Polyacrylamide beads, oil soluble aminated chlorovinyltoluene polymer suspending agent*

Recipe:
```
40 mls. aqueous 50 percent acrylamide
125 p.p.m. potassium persulfate  } acrylamide basis
125 p.p.m. sodium meta-bisulfite }
80 mls. commercial xylene
0.4 g. dimethyl amine aminated poly(chlorovinyltoluene)
    containing 0.1 percent nitrogen and 4.98 percent side
    chain chlorine
```

The aminated chlorovinyltoluene polymer was dissolved in the xylene. Otherwise a procedure similar to that of Example 3 was followed to give polyacrylamide beads having an appearance like those of Example 1.

*Example 10.—Polyacrylamide beads, gamma radiation initiation*

Recipe:
```
40 mls. aqueous 40 percent acrylamide
80 mls. xylene
0.6 g. low hydrophile-lyophile organic quaternary am-
    monium substituted bentonite
```

The aqueous acrylamide was added to the xylene containing the suspending agent with vigorous agitation to form a suspension of droplets of the aqueous phase in the oil phase. The suspension was exposed to a cobalt 60 source of gamma radiation for one hour while being gently stirred. The suspension was purged with nitrogen continuously during reaction. The reaction temperature rose from 24° to 40° C. during exposure to cobalt 60. The polymeric acrylamide beads were separated from the reaction medium, washed in xylene, and dried at 55° C. at 2 mm. pressure. The polymeric beads so obtained were crosslinked and insoluble in water. They ranged in particle diameter between 75 and 500 microns.

What is claimed is:

1. A water-in-oil suspension polymerization method for making polymers and copolymers of water-soluble ethylenically unsaturated monomers by forming a water-in-oil suspension of an aqueous solution containing between 5 and 80 weight percent of at least one water-soluble ethylenically unsaturated monomer in an inert hydrophobic liquid organic dispersion medium containing a suspending agent having a low hydrophile-lyophile balance, the ratio of aqueous monomer phase to said dispersion medium ranging between 5 and 75 weight parts of said aqueous phase to 95 to 25 parts of said dispersion medium, and heat-polymerizing the suspended monomer in the presence of a catalytic amount of a polymerization initiator to obtain a disperse phase polymeric product in bead form.

2. The method of claim 1, wherein the aqueous solution contains between 5 and 80 weight percent of monomer.

3. The method of claim 1, wherein the proportion of aqueous disperse phase ranges between 5 and 75 weight percent of the suspension.

4. The method of claim 2, wherein the monomer is acrylamide.

5. The method of claim 2, wherein the monomer is a mixture of acrylamide and p-vinylbenzyl trimethylammonium chloride.

6. The method of claim 2, wherein the monomer is acrylic acid.

7. The method of claim 2, wherein the monomer is ar styrene sodium sulfonate.

8. The method of claim 2, wherein the monomer is p-vinylbenzyl trimethylammonium chloride.

References Cited in the file of this patent

UNITED STATES PATENTS

| | | |
|---|---|---|
| 2,471,743 | Harrison | May 31, 1949 |
| 2,782,173 | Bristol et al. | Feb. 19, 1957 |
| 2,824,862 | Longley et al. | Feb. 25, 1958 |

OTHER REFERENCES

D'Alelio: "Fundamental Principles of Polymerization," Wiley & Sons (1952), page 212.

Schildknecht (II): "Polymer Processes," Interscience (1956), pages 73, 79 and 81.

Schildknecht: Vinyl and Related Polymers, Wiley & Sons (1952), pages 314–317.